UNITED STATES PATENT OFFICE.

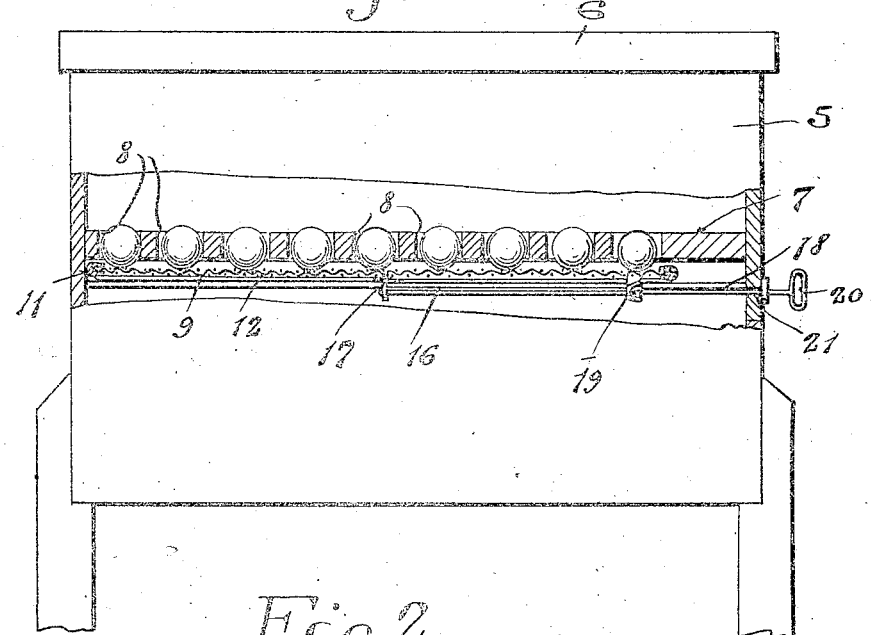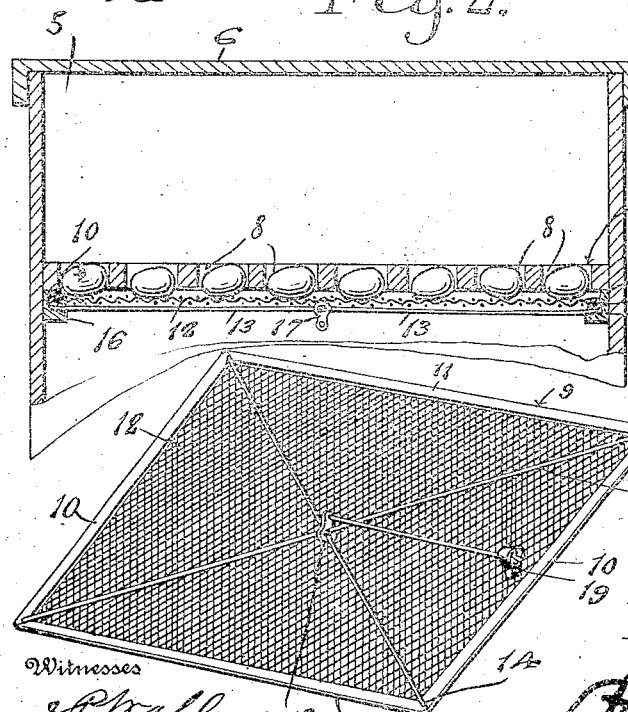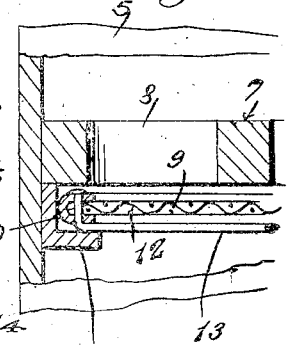

RUSSELL R. GULLION, OF SHELDON, IOWA.

EGG-TURNER.

1,311,814.  Specification of Letters Patent.  Patented July 29, 1919.

Application filed November 9, 1917. Serial No. 201,100.

*To all whom it may concern:*

Be it known that I, RUSSELL R. GULLION, a citizen of the United States, residing at Sheldon, in the county of O'Brien and State of Iowa, have invented certain new and useful Improvements in Egg-Turners; and I do hereby declare the following to be a full, clear, and exact description of the invention, such as will enable others skilled in the art to which it appertains to make and use the same.

This invention relates to improvements in egg turning devices for incubators.

The object of this invention is to provide an egg turning device for incubators, including an egg supporting tray which is movably mounted in an incubator to permit of the turning of the eggs when it is desired, in an easy and convenient manner.

A further object of this invention is to provide an egg turning device of this character which will be simple, practical and comparatively inexpensive in construction and one that can be manufactured and sold at a low cost.

With these and other objects in view the invention consists in the novel combination and arrangement of parts hereinafter more fully described and set forth in the claims hereto appended.

In the drawing—

Figure 1 is an elevation partly in section illustrating an incubator equipped with my improved egg turner, Fig. 2 is a vertical longitudinal sectional view of the same, Fig. 3 is an enlarged fragmentary transverse sectional view, Fig. 4 is a perspective view of the egg supporting tray and turner.

Like numerals of reference designate corresponding parts in all the figures of the drawing.

Referring to the drawing, the numeral 5 designates an incubator of any well known construction having a removable cover 6. A rectangular egg retaining tray 7 is removably secured within the incubator 5 intermediate the ends thereof and is provided with a plurality of relatively spaced egg receiving openings constituting cells or compartments 8, which openings or cells are substantially oblong in formation. The egg retaining tray 7 is adapted to be removed up through the open end of the incubator so as to permit the eggs to be left upon the supporting tray, which will be hereinafter more fully described.

An egg supporting tray 9 comprises side bars 10 and end bars 11. A foraminous body 12 is secured to the inner peripheral edge of the side and end bars and is reinforced by the right angularly related intersecting brace bars 13 which have their ends secured to the side and end bars as at 14. The side and end bars 10 and 11 respectively are substantially U-shaped in cross section so as to provide means whereby the edge of the foraminous body may be clamped to the side and end bars and securely held thereto, it being understood that the bars 13 reinforce the foraminous body and permit the eggs to readily rest upon the upper side thereof when the supporting tray is positioned within the incubator and under the egg retaining tray 7.

The egg supporting tray 9 is slidably mounted on the horizontal flanges of the angle rails 15 which are secured to the interior of the incubator 5 and support the egg retaining tray 7 therein. Thus it can be seen that the supporting tray will be located under the cells or openings in the egg retaining tray and permit the eggs to freely engage the upper surface of the supporting tray and be readily rolled or turned in their respective cells upon movement of the supporting tray in either direction.

The bars 13 are located upon the under side of the egg supporting tray 9, and as shown in Fig. 3 they support this tray upon the rails 15. As the tray 9 is supported upon the rails 15 by the bars 13, the friction between the tray and rails is reduced to the minimum, rendering it comparatively easy to shift the tray when it is desired to turn the eggs. The tray 9 is adapted to be moved or shifted by a rod which consists of sections 16 and 18. The section 16 is secured at one end to the brace bars 13 at their point of intersection by a member 17. The other end of this section is provided with a head 19 to which the inner end of the section 18 is detachably connected. The section 19 passes through opening 21 in one side wall of the incubator, and its outer end is provided with a hand loop 20. Since the rod section 18 is detachably connected to the rod section 16, the rod section 18 may be disconnected from the rod section 16 to permit the tray 9 to be placed within the incubator, and to prevent the tray 9 from being moved or shifted by an unauthorized person.

In practice, the eggs are positioned within the openings 8 of the tray 7 upon the foraminous body 12 of the tray 9. When it is desired to turn the eggs, it is only necessary to insert the rod section 18 through the opening 21 and connect it to the rod section 16, if such part is not already in place, and grasp the hand loop 20 and impart movement to the tray 9. If the rod section 18 is in place, it is only necessary to grasp the hand loop 20 when it is desired to impart movement to the tray 9.

Having thus described my invention what is claimed is:

1. An incubator including rails, an egg retaining tray located above the rails, an egg supporting tray slidably mounted upon the rails, angularly arranged and intersecting brace bars secured to the supporting tray, a rod section secured to said brace bars at their points of intersection, and a second rod section detachably connected to the first section and passing through and beyond one side wall of the incubator.

2. An incubator including rails, an egg retaining tray located above the rails, an egg supporting tray, angularly related and intersecting brace bars secured to said supporting tray and slidably supporting said tray upon the rails, a rod section secured to said brace bars at their point of intersection, and a second rod section detachably connected to the first section and passing through and beyond one side wall of the incubator.

In testimony whereof I affix my signature in presence of two witnesses.

RUSSELL R. GULLION.

Witnesses:
ALLAN M. SMITH,
A. H. COBB.